United States Patent [19]
Vo

[11] Patent Number: 6,012,346
[45] Date of Patent: Jan. 11, 2000

[54] LOW VIBRATION MOTION TRANSLATION SYSTEM

[75] Inventor: Anh Vo, Woodland Hills, Calif.

[73] Assignee: New Hampshire Ball Bearing, Inc., Chatsworth, Calif.

[21] Appl. No.: 09/156,578

[22] Filed: Sep. 18, 1998

[51] Int. Cl.[7] .............................. F16H 25/12; B23D 49/16
[52] U.S. Cl. .................................................. 74/57; 30/392
[58] Field of Search .................................. 74/57; 30/392

[56] References Cited

U.S. PATENT DOCUMENTS

| | | |
|---|---|---|
| 284,827 | 9/1883 | Elwell .......................................... 74/57 |
| 1,871,020 | 8/1932 | Wyzenbeek ................................ 30/392 |
| 3,260,289 | 7/1966 | Whitten, Jr. . |
| 3,958,460 | 5/1976 | Pierce . |
| 3,978,862 | 9/1976 | Morrison . |
| 4,237,741 | 12/1980 | Huf et al. . |
| 4,796,430 | 1/1989 | Malaker et al. . |
| 4,834,033 | 5/1989 | Larsen . |
| 5,025,562 | 6/1991 | Palm . |
| 5,050,307 | 9/1991 | Palm . |
| 5,079,844 | 1/1992 | Palm . |
| 5,229,670 | 7/1993 | Kagawa . |
| 5,239,340 | 8/1993 | Kagawa . |
| 5,268,970 | 12/1993 | Tanaka . |
| 5,450,925 | 9/1995 | Smith et al. . |
| 5,566,458 | 10/1996 | Bednar . |
| 5,607,023 | 3/1997 | Palm . |
| 5,689,891 | 11/1997 | Bednar et al. . |

*Primary Examiner*—Allan D. Herrmann
*Attorney, Agent, or Firm*—Amster, Rothstein & Ebenstein

[57] ABSTRACT

A low vibration motion translation system for converting continuous rotary motion into reciprocating linear motion employs a counterweight or counterbalance mechanism moving in the opposing direction to the reciprocating linear driver or piston to reduce vibration. As the counterbalance is driven linearly in the opposing direction to the reciprocating piston, opposing forces are generated to counteract the unbalanced forces created by the translation, with a resultant reduction in vibration.

16 Claims, 4 Drawing Sheets

LOW VIBRATION MOTION TRANSLATION SYSTEM

BACKGROUND OF THE INVENTION

The present invention relates to a motion translation system for converting continuous rotary motion into reciprocating linear motion, and more particularly to such a system which reduces the vibration arising out of the rotational imbalance of the conventional assembly.

U.S. Pat. No. 3,260,289, issued Jul. 12, 1966, is directed to a saber saw attachment which includes a motion translation system for converting the rotary motion of a shaft member into the reciprocating linear motion of a piston member. FIG. 1 hereof is a reproduction of FIG. 2 of the patent and shows, among other components, a hollow housing member 12, a piston member 28, a shaft member 14, and a single ball bearing 46. The housing member is hollow and open at each end. The piston member is slidably and non-rotatably supported within the housing and has means at the front end for removably receiving a saber saw blade or the like and a central longitudinal opening in the rear end thereof. The central longitudinal opening of the piston member has a bearing raceway formed therein which is substantially semicircular in cross-section and positioned substantially in a plane perpendicular to the longitudinal axis of the piston member. The shaft member is rotatably supported in the housing member and has a portion thereof extending exteriory of the rear end of the housing and a portion thereof extending slidably within the longitudinal opening of the piston member. The shaft member has a circumferential raceway formed in the exterior surface thereof, the raceway being substantially semicircular in cross-section and positioned substantially in a plane at an angle to the axis of the shaft member. A single ball bearing is positioned within the piston raceway and the shaft raceway. For further details, see U.S. Pat. No. 3,260,289, the substance of which is incorporated herein by reference. The specification mentions that a diametrically opposed pair of ball bearings may be used when a double-acting raceway (that is, a raceway which makes two back-and-forth oscillations in one revolution of the shaft) is desired.

Vibration is caused by many variables and deemed unavoidable in many mechanical systems. Common sources of vibrations are imperfections of components, wear from usage, and errors in installation (due to linkage and/or housing/shaft fittings). Other contributors are speed above resonant frequencies, insufficient stiffness of the assembly, and unbalanced forces of the system.

The current approaches used to address vibrations are to improve the manufacturing techniques, to add wear-resistance properties to the system, and to improve the mounting/coupling methods. Reduction of mass in the system will produce different frequencies, thus resulting in an "acceptable" vibrational level. Also, adding a vibration-absorption system can further reduce the amount of vibrations. These approaches are part of the improvement to any mechanical system.

When these approaches do not reduce vibrations sufficiently, other methods should be employed. From simple mechanics of motion, unbalanced forces contribute directly to the vibration level, and at times are detrimental to the system. By reducing or eliminating these unbalanced forces, the system vibration level should be minimized.

In the continuous rotary-to-reciprocating linear motion translation system, the forces change dynamically due to the imbalances of the design. Adding a counterbalance is an idea suited to address this issue. However, an ideal counterbalance needs to vary and to adjust itself to these changing forces.

Perhaps the best example of this counterbalance application would be the conventional crank shaft-piston connecting rod transmission system. Here, the counterbalancing weights are located and integrated into one side of the crank shaft. The pivoting rollers (or bearings) to drive the connecting (piston) rod are also positioned and integrated into the crank shaft, but on an opposite side of the crankshaft and eccentric to the center of the crank shaft rotation. As the crank shaft rotates, the eccentricity of pivoting rollers and the movement of the connecting rod generate unbalanced forces. The one sidedness of the counterbalance weights then generate opposing forces to cancel the unbalanced forces of the pivoting rollers and connecting rods assembly. Thus the vibrational level of the engine is not as high as it would have been without the counterbalance.

Most known counterbalance systems move about the axis of rotation and direct the opposing forces perpendicular to the axis of rotation.

Accordingly, it is an object of the present invention to provide a motion translation system having a counterbalance which does not move about the axis of rotation.

Another object is to provide such a system which directs the opposing forces linearly in the opposing directions of the piston member or reciprocating linear motion driver and the counterbalance, thereby to provide linear motion of each parallel to the axis of rotation.

SUMMARY OF THE INVENTION

It has now been found that the above and related objects of the present invention are obtained in a low vibration motion translation system for converting continuous rotary motion into reciprocating linear motion. The system comprises a hollow housing member, a shaft member, a piston member, a counterbalance member and a pair of diametrically opposed ball drivers. The hollow housing member is open at a first end and has means at a second end for receiving an element for reciprocation. The shaft member is rotatably supported in the housing member and has a portion thereof exterior of one end of the housing member and an opposed portion thereof extending slidably within a central longitudinal opening cooperatively formed by the piston member and the counterbalance member. The shaft member has a circumferential ball driver raceway formed in the exterior surface thereof, the raceway being preferably semicircular in cross-section and being positioned substantially in a plane at an angle to the longitudinal axis of the shaft member. The piston member is slidably and non-rotatably supported within the housing member, and defines at least in part a central longitudinal opening in one end thereof. The central longitudinal opening in the piston member has a ball driver pocket formed therein, the piston pocket being preferably substantially circular in cross-section and being positioned substantially in a plane perpendicular to the longitudinal axis of the piston member. The counterbalance member is slidably and non-rotatably supported within the housing member, and defines at least in part a central longitudinal opening in one end thereof. The central longitudinal opening in the counterbalance member has a ball driver pocket formed therein, the counterbalance pocket being preferably substantially circular in cross-section and being positioned substantially in a plane perpendicular to the longitudinal axis of the counterbalance member. The diametrically opposed pair of ball drivers has one positioned within the piston pocket and the shaft raceway and one positioned in the counterbalance pocket and the shaft raceway.

In a preferred embodiment, a linking means (e.g., a pin means) is provided for securing together against relative rotation the housing member, the piston member and the counterbalance member. The pin means is snugly received in the housing member and the piston member, but relatively loosely received in the counterbalance member.

Preferably, the counterbalance member has a weight at least equal to that of the housing member, the piston member and the pin means.

The raceway of the shaft member is preferably sinusoidal, and the system includes means for slidably and non-rotatably supporting the housing.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
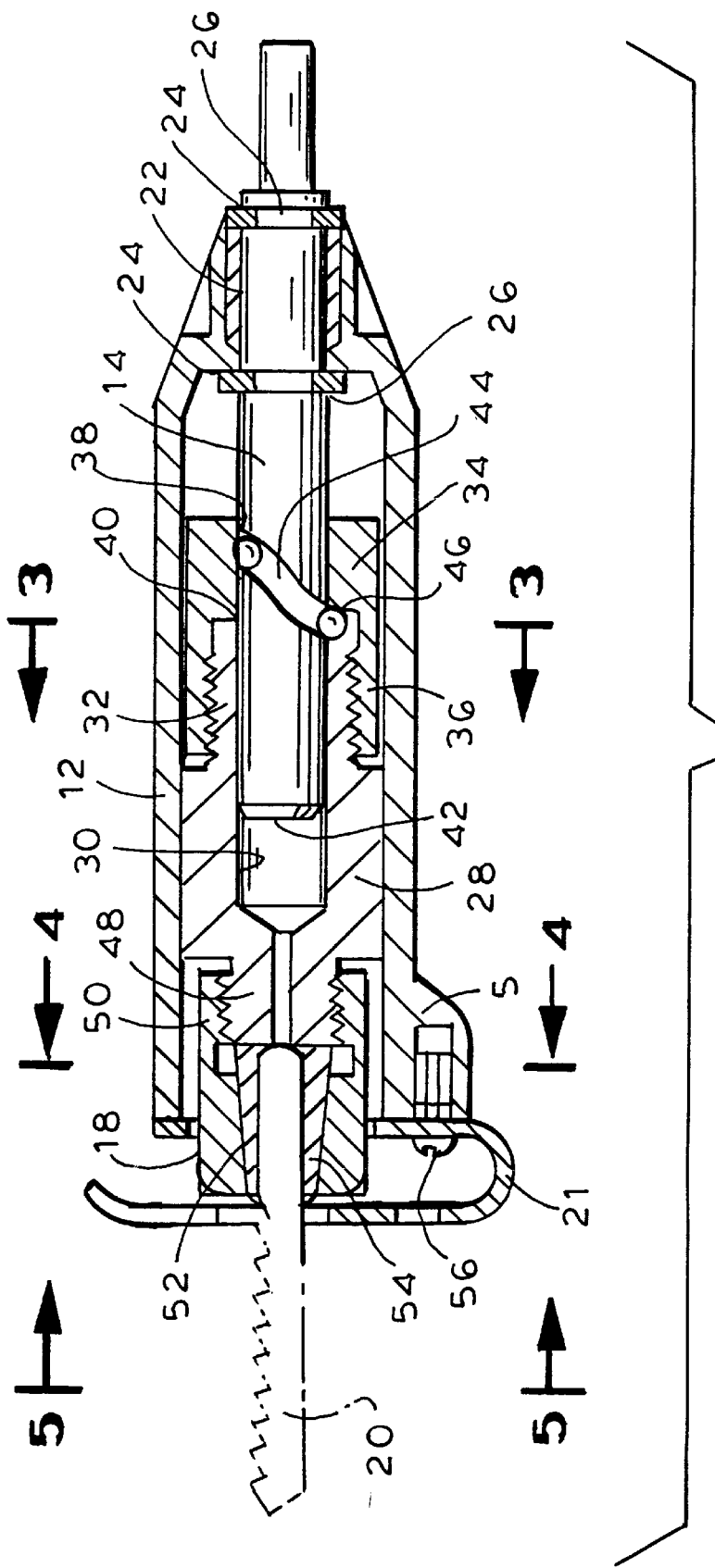
FIG. 1 is a reproduction of FIG. 2 of U.S. Pat. No. 3,260,289 and is labeled "PRIOR ART"
Figure 2:
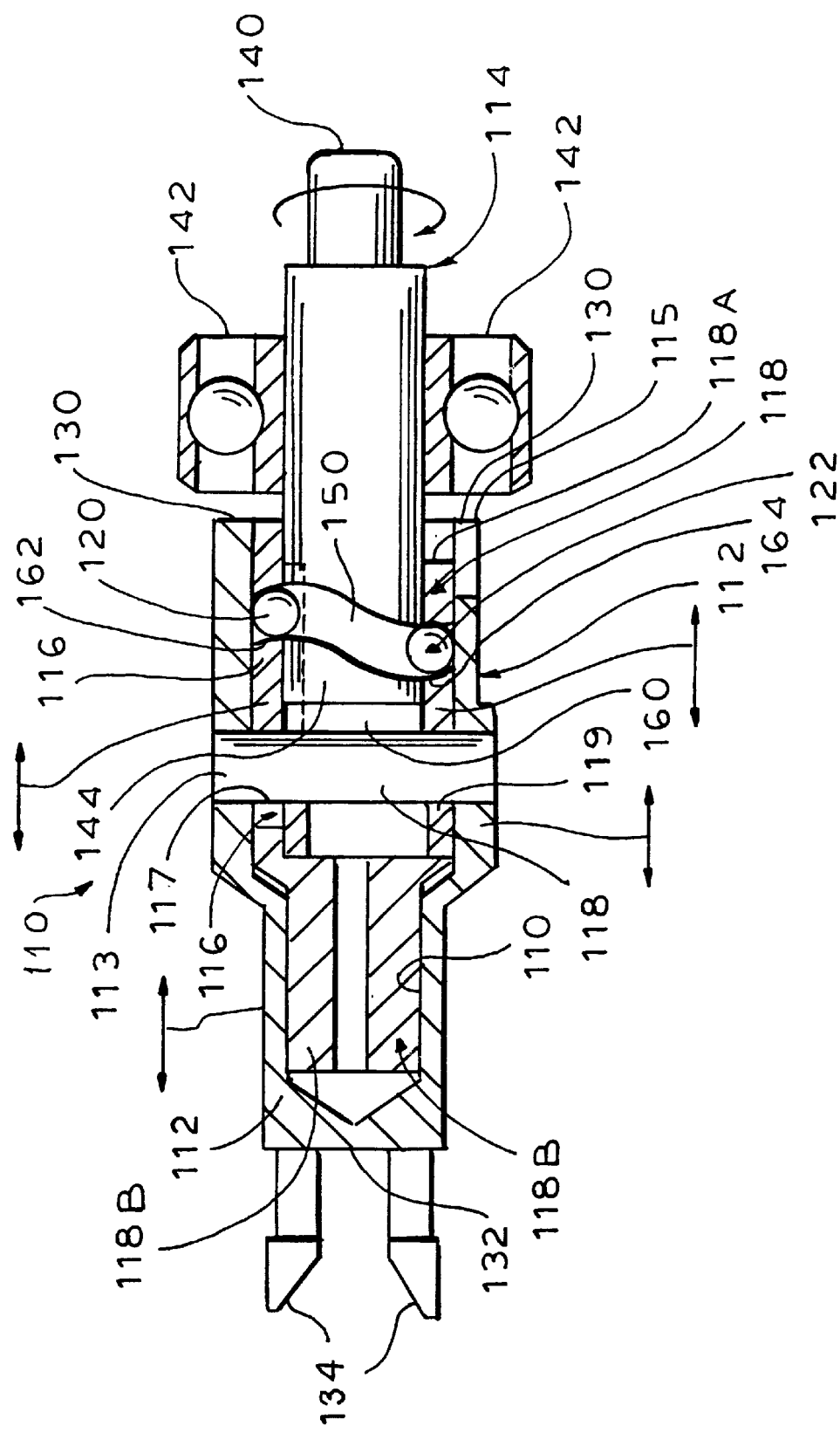
FIG. 2 is a side elevational view, partially in cross-section, of a first embodiment of a system according to the present invention.
Figure 3:
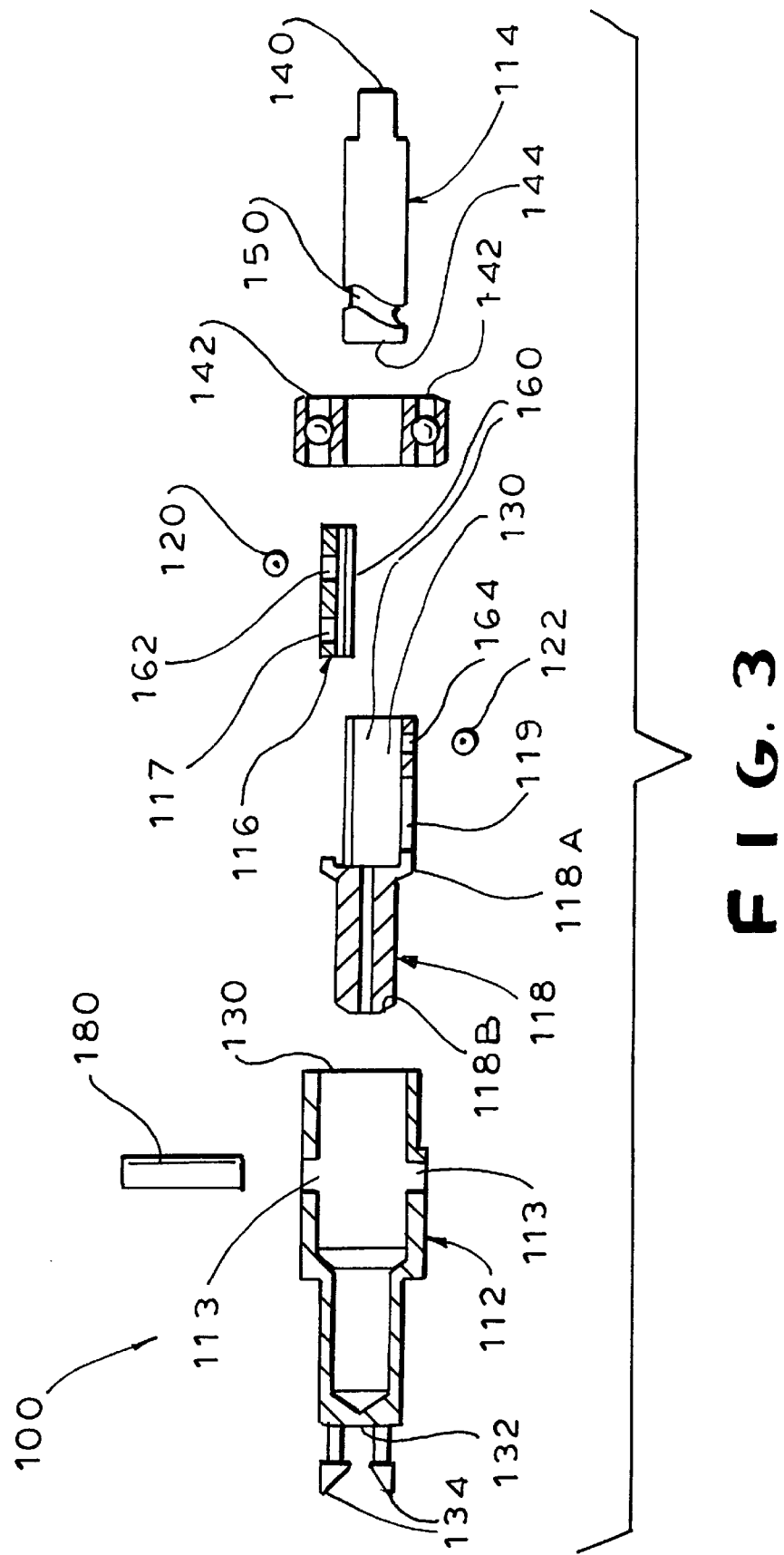
FIG. 3 is an exploded side elevational view thereof.

Referring now to the drawing, and in particular to FIGS. 2 and 3 thereof, therein illustrated is a low vibration motion translation system according to the present invention, generally designated by the reference numeral 100. The motion translation system 100 is adapted to convert continuous rotary motion into reciprocating linear motion. The basic components of the system 100 include a hollow housing member generally designated 112, a shaft member generally designated 114 rotatably supported in the housing member 112, a piston member generally designated 116 slidably and non-rotatably supported within the housing member 112, a counterbalance member generally designated 118 slidably and non-rotatably supported within the housing member 112, and a diametrically opposed pair of ball drivers generally designated 120, 122. As will be explained hereinbelow in further detail, the system 100 converts the continuous rotary motion of shaft 114 into the reciprocating linear motion of housing 112.

In its conventional aspects (that is, without the vibration reduction aspects), the motion translation system may be generally similar to that shown in U.S. Pat. No. 3,260,289.

Thus, the housing 112 is hollow and open at a back end 130 thereof. It may be either open or closed at the front end 132. Housing 112 undergoes the desired output—that is, reciprocating linear motion—and may act either directly or indirectly on another element or tool. For example, as illustrated, it may act directly via a pair of integral fingers 134 at the front end 132 thereof or indirectly via a chucking arrangement (not shown) whereby another element or tool is affixed to the housing 112 for reciprocation. The external surface of the housing 112 is preferably supported by a fixed support (not shown) for slidably and non-rotatably supporting the housing 112. Thus the housing 112 may pass through a support having an internal polygonal configuration which conforms to an external polygonal configuration of the housing 112. If the exterior surface of the housing 112 is round (as illustrated), it preferably defines at least one flat 113 which is longitudinally slidable relative to a fixed support, but not rotatable relative to the fixed support.

The shaft 114 is rotatably and non-slidably supported in the housing 112 with a rear portion 140 thereof extending exteriorly of the back end 130 of the housing 112 and a front portion 144 thereof. The shaft rear portion 140 extending exteriorly of the housing 112 is typically supported by a conventional bearing system 142. The shaft 114 has a circumferential ball driver raceway 150 formed in the exterior surface thereof behind the front end 144 of the shaft. The shaft raceway 150 is positioned substantially in a plane at an angle to the longitudinal axis of the shaft 114 and is preferably substantially semicircular in cross-section; it is preferably sinusoidal in configuration and provides only a single action.

The piston 116 is slidably and non-rotatably supported within the housing 112 and defines at least in part a central longitudinal opening 160. A ball driver pocket 162 communicating with the central longitudinal opening 160 of piston 116 (for partial receipt of a ball driver 120, as described below) is positioned substantially in a plane perpendicular to the longitudinal axis of the piston 116 and is preferably substantially circular in cross-section.

The counterbalance 118 is also slidably and non-rotatably supported within the housing 112 and defines at least in part the central longitudinal opening 160. A ball driver pocket 164 communicating with the central longitudinal opening 160 of counterbalance 118 (for partial receipt of a ball driver 122, as described below) is positioned substantially in a plane perpendicular to the longitudinal axis of the counterbalance 118 and is preferably substantially circular in cross-section.

Figure 4:
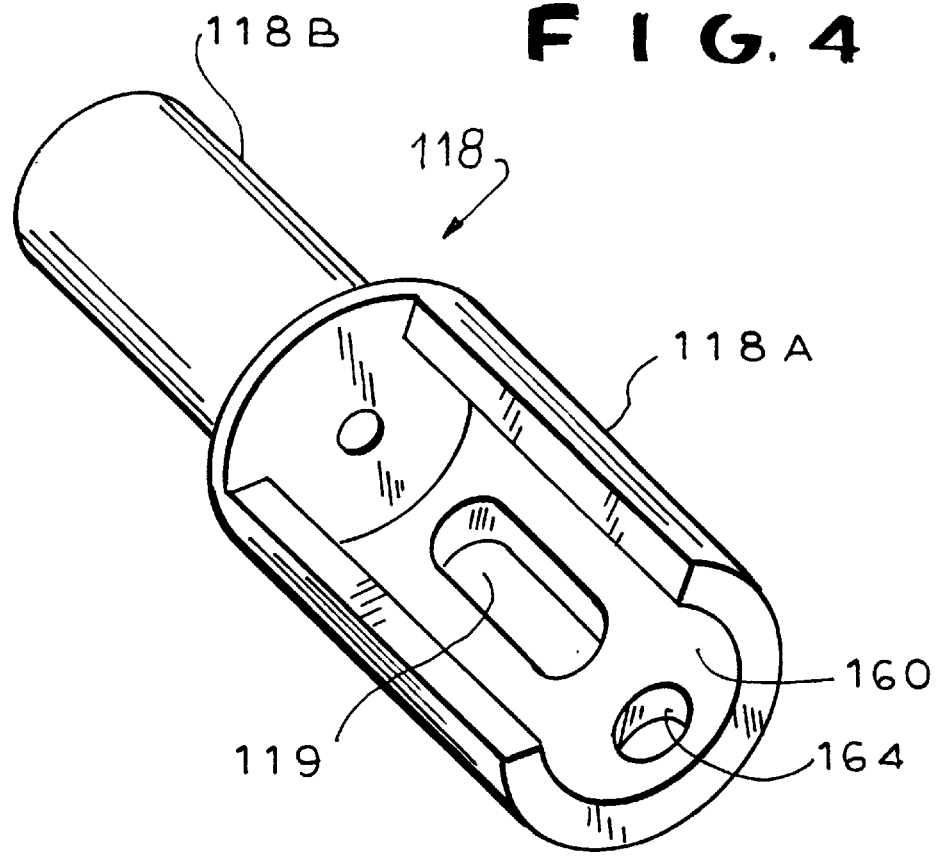
FIG. 4 is an isometric view of the counterbalance.

Referring now to FIG. 4 in particular, therein illustrated is a counterbalance 118 suitable for use in the first embodiment 100 of the present invention. The back portion 118A of counterbalance 118 defines the ball driver pocket 164 (which partially receives a ball driver 122, as described below) and the slot 119 (through which the linking pin 180 passes, as described below). The slot 119 is long enough to permit travel of the linking pin 180 therein without limiting the reciprocating linear motion of the counterbalance 118. The front end 118B of counterbalance 118 is spaced forwardly of the linking pin 180 and fits within the forward portion of the central longitudinal opening 160. The function of the front end 118B is to enable the weight of the counterbalance 118, as a whole, to meet requirements set forth below.

Thus, the piston 116 and the counterbalance 118 cooperatively define the central longitudinal opening 160. The front end 144 of shaft 114 extends slidably within the longitudinal opening 160 cooperatively formed by the central longitudinal opening in the piston 116 and the central longitudinal opening in the counterbalance 118.

In the preferred embodiment illustrated, the longitudinal axis of the shaft 114, the longitudinal axis of the piston 116, and the longitudinal axis of the counterbalance 118 are parallel so that the plane perpendicular to the longitudinal axis of the piston 116 and the plane perpendicular to the longitudinal axis of the counterbalance 118 are also parallel.

Linking means 180, such as pin means, are provided for securing together against relative rotation the housing 112, the piston 116, and the counterbalance 118. The linking pin 180 is spaced forwardly of the front end 144 of shaft 114, even in the extreme forward orientation of shaft 114, so that it does not interfere with shaft rotation. The linking pin 180 is snugly received in the housing aperture 113 and the piston aperture 117 but relatively loosely received in the counterbalance slot 119. The linking pin 180 links both the piston 116 and the counterbalance 118 against rotation relative to the housing 112 and for sliding movement in opposite directions to each other. Many alternative linking means are available to slidably and non-rotatably support the piston 116 and the counterbalance 118 within the central opening 160 of the housing 112, such as placing internal splines (not shown) in housing 112 to engage longitudinal grooves (also not shown) in the piston 116 and counterbalance 118.

In the first embodiment of the 100 of the present invention (illustrated in FIGS. 2 and 3) linking means 180 additionally secures together for reciprocating linear motion along a longitudinal axis the housing 112 and the piston 116, for reasons which will become apparent hereinafter.

A pair of ball drivers 120, 122 is provided. One such ball driver 120 is positioned partially within the shaft raceway 150 and partially within the piston pocket 162. The other ball driver 122 is diametrically opposed to ball driver 120 and is positioned partially within the shaft raceway 150 (180° away from the ball driver 120) and partially in the counterbalance pocket 164.

As the shaft 112 rotates, the sinusoidal shaft raceway 150 acts as a cam track and pushes the ball drivers 120, 122 to drive both the piston 116 and the counterbalance 118 with a reciprocating linear motion in opposite directions. The sinusoidal shaft raceway 150 provides a simple harmonic motion for the linear travel as well as smooth transitions between the forward and reverse directions of the reciprocating elements 116, 118. The length of linear travel is measured from the center of the shaft raceway radius at the "retracted" position to the center of the shaft raceway radius at the "extended" position. The "retracted" position refers to one extreme position of the shaft raceway, while the "extended" position refers to the opposite extreme position of the shaft raceway.

Other attributes of the sinusoidal shaft raceway or cam track are the curvature of the cam track and the track depth (i.e., the raceway depth), both with respect to the ball driver diameter. Curvature of the track refers to the radius of the track divided by the diameter of the ball drivers. This curvature value is expressed as a percentage and should preferably be greater than 51% (0.51). The smaller the curvature, the greater load handling capability. However, systems with a smaller curvature present higher torque and quicker heat build-ups when compared to systems with a higher curvature. Track depth refers to the percentage of the ball driver diameter in the groove of the track. In systems with axial force present (i.e., force along the axis of shaft rotation), sufficient depth is required to transmit the forces and to prevent over-riding of the ball drivers onto the cam track shoulders.

In operation, the ball driver 120 pushes the reciprocating linear motion driver or piston 116 forward and reverse due to rotary motion of the sinusoidal shaft raceway 150. The piston 116 must encapsulate the center of the ball 120 (along the axis of rotation) in the raceway track 150 of the shaft 114. This means that the inner diameter of the piston 116 is below the center of the ball driver 120 while the outer diameter of the piston 116 is below the top of the ball driver 120. The ball pocket 162 of the piston 116 should be slightly larger than the ball driver 120 to prevent added vibrations to the system. The piston 116 should not rotate; thus it must have an anti-rotation feature.

Similarly, in operation, the ball driver 122 pushes the counterbalance 118 forward and reverse due to rotary motion of the sinusoidal shaft raceway 150. The counterbalance 118 must encapsulate the center of the ball 122 (along the axis of rotation) in the raceway track 150 of the shaft 114. This means that the inner diameter of the counterbalance 118 is below the center of the ball driver 122, while the outer diameter of the counterbalance 118 is below the top of the ball driver 122. The ball pocket 164 of the counterbalance 118 should be slightly larger than the ball driver 122 to prevent added vibrations to the system. The counterbalance 118 should not rotate; thus it too must have an anti-rotation feature.

The anti-rotation feature is provided by the linking means 180, such as the dowel (or roll) pin inserted through the housing 112, the piston 116, and the counterbalance 118. The linking pin 180 also serves as a link that ties the longitudinal motion of the piston 116 to the housing 112, causing the housing 112 to move with the piston 116 as a unit. The linking pin 180 should have a tight (or interference) fit with both the piston 116 and the housing 112. This is to ensure full contact and eliminate any linear longitudinal looseness that could contribute more to the vibrational level. On the other hand, the fit between the linking pin 180 and the counterbalance 118 should be relatively loose. The purpose of the linking pin 180 in this respect is only to prevent relative rotation of the counterbalance 118, and not to link the counterbalance 118 and housing 112 for linear motion.

Because the ball drivers are located 180° apart, any forces transmitted to the piston 116 will be accompanied by opposing forces transmitted to the counterbalance 118. It is the same mechanism that drives the piston 116, but directed in the opposite direction. The counterbalance 118 should weigh as much as or more than the combined housing 112, piston 116, and the linking means 180. From the side, the shape of the counterbalance 118 must be symmetrical to evenly distribute the load, with respect to the center of the force-transmitting ball driver 122. However, from the front, the shape could vary to accommodate the available space. Adding a dry-film lubricant coating to the contacting surfaces of the piston 116 and the counterbalance 118 may contribute to the reduction of friction.

In manufacturing, the housing 112, piston 116, and the linking means 180 are weighed together. The weight of the counterbalance 118 should be at least equal to this weight, if possible; if not possible, it should at least be close thereto. If the counterbalance 118 weighs less, the weight of the housing 112 can be reduced by removing the housing material in strategic areas. (Since the housing is a non-rotating component, imbalance from rotational dynamics does not apply.) The external surface of the housing could be similar to the dimples seen on golf balls. If the counterbalance 118 weighs more, the additional connection from the end-user attached to the housing 112 (not discussed herein) will compensate.

Figure 5:
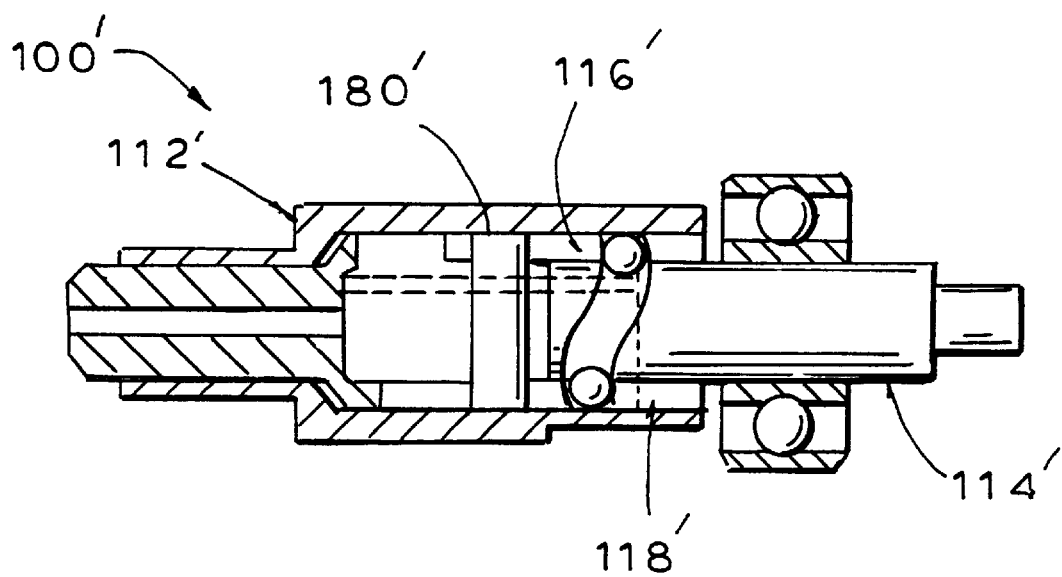
FIG. 5 is a side elevational view, partially in cross-section, of a second embodiment.

Referring now to FIG. 5 in particular, in a second embodiment 100' of the present invention otherwise similar to the first embodiment 100, the hollow housing member 112' is open at both ends. The linking means 180' and the housing 112' are not only non-rotatable, but also non-slidable, with the piston 116' alone providing the useful reciprocating linear motion. In such an embodiment, the linking means 180' would link together only the piston 116' and the counterbalance 118', leaving the housing 112' isolated. As the linking means 180' is disposed forwardly of the shaft 114', it does not interfere with rotation of the shaft 114'. On the other hand, the linking means 180' is secured to the piston 116' and counterbalance 118' in such a manner as to preclude rotation thereof. In such an embodiment, the counterbalance 118' should have a weight at least equal to that of the combined piston 116' and linking means 180' (but not including the housing 112'). The linking means 180' is fixed against rotation by being secured to a fixed support which permits reciprocating linear motion thereof, but not rotation thereof.

To summarize, the present invention provides a motion translation system for converting continuous rotary motion into reciprocating linear motion, the motion translation system having a counterbalance which does not move about the axis of rotation. The system directs the opposing forces linearly in the opposing directions of the piston member or reciprocating linear motion driver and the counterbalance, thereby to provide reciprocating linear motion of each parallel to the axis of rotation, thereby to reduce vibration.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A low vibration motion translation system for converting continuous rotary motion into reciprocating linear motion, comprising:

(A) a hollow housing member open at a first end and having means at a second end for receiving an element for reciprocation;

(B) a piston member slidably and non-rotatably supported within said housing member, said piston member defining at least in part a central longitudinal opening in one end thereof, said central longitudinal opening in said piston member having a ball driver pocket formed therein, said piston pocket being positioned substantially in a plane perpendicular to the longitudinal axis of said piston member;

(C) a counterbalance member slidably and non-rotatably supported within said housing member, said counterbalance member defining at least in part a central longitudinal opening in one end thereof, said central longitudinal opening in said counterbalance member having a ball driver pocket formed therein, said counterbalance pocket being positioned substantially in a plane perpendicular to the longitudinal axis of said counterbalance member;

(D) a shaft member rotatably supported in said housing member, said shaft member having a portion thereof exterior of one end of said housing member and having an opposed portion thereof extending slidably within a central longitudinal opening cooperatively formed by said piston member and said counterbalance member, said shaft member having a circumferential ball driver raceway formed in the exterior surface thereof, said raceway being positioned substantially in a plane at an angle to the longitudinal axis of said shaft member; and (E) a substantially diametrically opposed pair of ball drivers, one positioned within said piston pocket and said shaft raceway and one positioned in said counterbalance pocket and said shaft raceway.

2. The system of claim 1 including:

(F) linking means for securing together against relative rotation said housing member, said piston member and said counterbalance member.

3. The system of claim 2 wherein said linking means is a pin means snugly received in said housing member and said piston member and relatively loosely received in said counterbalance member.

4. The system of claim 2 wherein said counterbalance member has a weight at least equal to that of said housing member, said piston member and said linking means.

5. The system of claim 1 wherein said raceway of said shaft member is sinusoidal.

6. The system of claim 1 wherein said piston pocket and said counterbalance pocket are substantially circular in cross-section, and said shaft member raceway is substantially semi-circular in cross-section.

7. A low vibration motion translation system for converting continuous rotary motion into reciprocating linear motion, comprising:

(A) a hollow housing member open at a first end and having means at a second end for receiving an element for reciprocation;

(B) a piston member slidably and non-rotatably supported within said housing member, said piston member defining at least in part a central longitudinal opening in one end thereof, said central longitudinal opening in said piston member having a ball driver pocket formed therein, said piston pocket being substantially circular in cross-section and positioned substantially in a plane perpendicular to the longitudinal axis of said piston member;

(C) a counterbalance member slidably and non-rotatably supported within said housing member, said counterbalance member defining at least in part a central longitudinal opening in one end thereof, said central longitudinal opening in said counterbalance member having a ball driver pocket formed therein, said counterbalance pocket being substantially circular in cross-section and positioned substantially in a plane perpendicular to the longitudinal axis of said counterbalance member;

(D) a shaft member rotatably supported in said housing member, said shaft member having a portion thereof exterior of one end of said housing member and having an opposed portion thereof extending slidably within a central longitudinal opening cooperatively formed by said piston member and said counterbalance member, said shaft member having a circumferential ball driver raceway formed in the exterior surface thereof, said raceway being substantially semi-circular in cross-section and positioned substantially in a plane at an angle to the longitudinal axis of said shaft member;

(E) a substantially diametrically opposed pair of ball drivers, one positioned within said piston pocket and said shaft raceway and one positioned in said counterbalance pocket and said shaft raceway; and (F) linking means for securing together against relative rotation said housing member, said piston member and said counterbalance member, said means being snugly received in said housing member and said piston member and relatively loosely received in said counterbalance member;

said counterbalance member having a weight at least equal to that of said housing member, said piston member and said pin means.

8. A low vibration motion translation system for converting continuous rotary motion into reciprocating linear motion, comprising:

(A) a non-slidable and non-rotatable hollow housing member open at both a first end and a second end;

(B) a piston member slidably and non-rotatably supported within said housing member, said piston member defining at least in part a central longitudinal opening in one end thereof, said central longitudinal opening in said piston member having a ball driver pocket formed therein, said piston pocket being positioned substantially in a plane perpendicular to the longitudinal axis of said piston member;

(C) a counterbalance member slidably and non-rotatably supported within said housing member, said counterbalance member defining at least in part a central longitudinal opening in one end thereof, said central longitudinal opening in said counterbalance member having a ball driver pocket formed therein, said counterbalance pocket being positioned substantially in a plane perpendicular to the longitudinal axis of said counterbalance member;

(D) a shaft member rotatably supported in said housing member, said shaft member having a portion thereof exterior of one end of said housing member and having an opposed portion thereof extending slidably within a central longitudinal opening cooperatively formed by said piston member and said counterbalance member, said shaft member having a circumferential ball driver raceway formed in the exterior surface thereof, said raceway being substantially semi-circular in cross-section and positioned substantially in a plane at an angle to the longitudinal axis of said shaft member; and (E) a substantially diametrically opposed pair of ball drivers, one positioned within said piston pocket and said shaft raceway and one positioned in said counterbalance pocket and said shaft raceway.

9. The system of claim 8 including:

(F) linking means for securing together against relative rotation said piston member and said counterbalance member.

10. The system of claim 9 wherein said linking means is snugly received in said piston member and relatively loosely received in said counterbalance member.

11. The system of claim 9 wherein said counterbalance member has a weight at least equal to that of said housing member, said piston member and said linking means.

12. The system of claim 8 wherein said raceway of said shaft member is sinusoidal.

13. The system of claim 8 wherein said piston member has a portion thereof extending exteriorly of the other end of said housing member.

14. The system of claim 8 wherein said piston pocket and said counterbalance pocket are substantially circular in cross-section, and said shaft member raceway is substantially semi-circular in cross-section.

15. A low vibration motion translation system for converting continuous rotary motion into reciprocating linear motion, comprising:

(A) a non-slidable and non-rotatable hollow housing member open at both a first end and a second end;

(B) a piston member slidably and non-rotatably supported within said housing member, said piston member defining at least in part a central longitudinal opening in one end thereof, said central longitudinal opening in said piston member having a ball driver pocket formed therein, said piston pocket being substantially circular in cross-section and positioned substantially in a plane perpendicular to the longitudinal axis of said piston member;

(C) a counterbalance member slidably and non-rotatably supported within said housing member, said counterbalance member defining at least in part a central longitudinal opening in one end thereof, said central longitudinal opening in said counterbalance member having a ball driver pocket formed therein, said counterbalance pocket being substantially circular in cross-section and positioned substantially in a plane perpendicular to the longitudinal axis of said counterbalance member;

(D) a shaft member rotatably supported in said housing member, said shaft member having a portion thereof exterior of one end of said housing member and having an opposed portion thereof extending slidably within a central longitudinal opening cooperatively formed by said piston member and said counterbalance member, said shaft member having a circumferential ball driver raceway formed in the exterior surface thereof, said raceway being substantially semi-circular in cross-section and positioned substantially in a plane at an angle to the longitudinal axis of said shaft member;

(E) a substantially diametrically opposed pair of ball drivers, one positioned within said piston pocket and said shaft raceway and one positioned in said counterbalance pocket and said shaft raceway; and (F) linking means for securing together against relative rotation said piston member and said counterbalance member, said linking means being snugly received in said piston member and relatively loosely received in said counterbalance member;

said counterbalance member having a weight at least equal to that of said housing member, said piston member and said linking means.

16. The system of claim 15 wherein said piston member has a portion thereof extending exterior of the other end of said housing member.

* * * * *